Feb. 16, 1937.  C. L. STRAITH  2,070,760
SAFETY DEVICE FOR AUTOMOBILES
Filed April 1, 1935
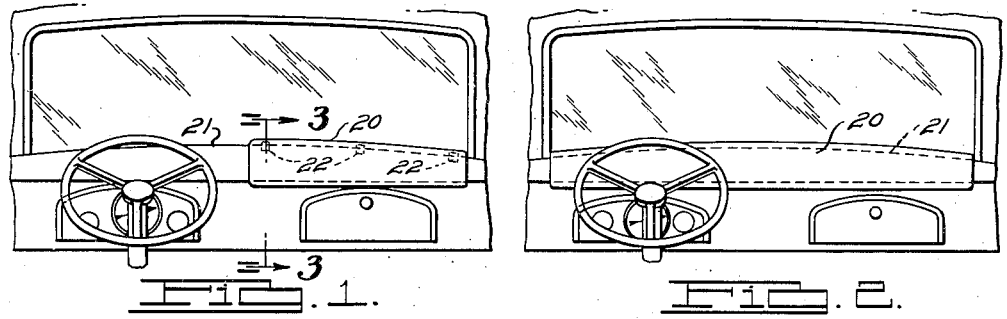
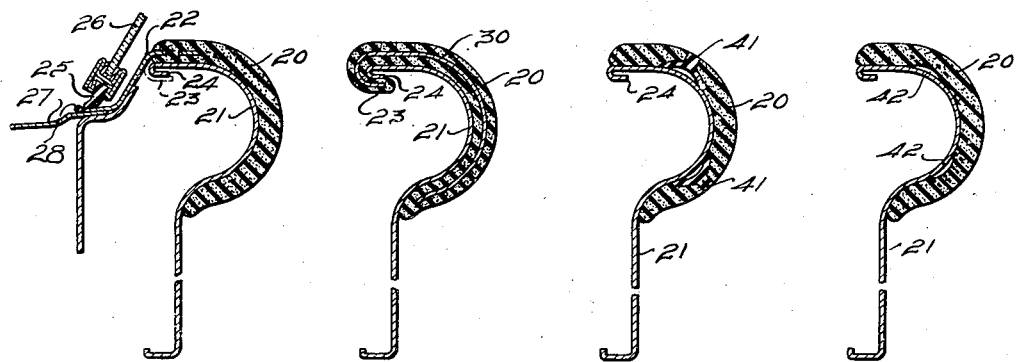
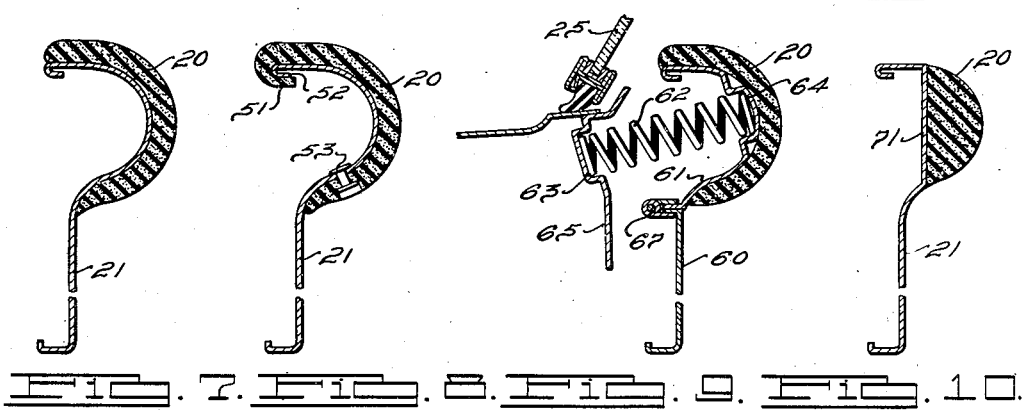
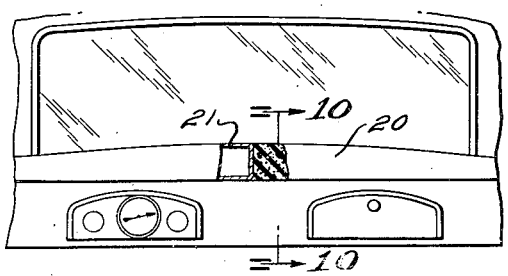
INVENTOR.
Claire L. Straith.
BY
Hamess, Dickey, Pierce & Hann.
ATTORNEYS.

Patented Feb. 16, 1937

2,070,760

UNITED STATES PATENT OFFICE 2,070,760

SAFETY DEVICE FOR AUTOMOBILES

Claire L. Straith, Detroit, Mich.

Application April 1, 1935, Serial No. 14,116

5 Claims. (Cl. 280—150)

The present invention relates to protective devices for use in vehicle interiors, and more particularly to a protective device for use in connection with the dash or instrument panel of an automobile.

The object of the present invention is to provide a relatively compressible protective device in connection with the part or parts of an automobile body most subject to impact by passengers in the event of abrupt stops.

It is also an object of the present invention to provide a cushioning protective device in connection with the dash or instrument panel, particularly adapted to prevent facial injuries to passengers.

It is also an object of the present invention to provide an automobile dash or instrument panel construction embodying a cushioning member extending partially across the panel and flush with the remaining surface thereof.

It is also an object of the present invention to provide an automobile dash or instrument panel construction embodying a resiliently mounted upper portion, disposed to absorb and cushion the impact of a passenger's body in the event of a collision.

It is also an object of the present invention to provide a protective device of the above character which may be readily attached or detached from the supporting panel, and which may be retained in place by clips, frictionally, or by suction members.

Other objects and advantages of the present invention appear in the following description and in the appended claims.

In the drawing:

Figure 1 is a view in elevation illustrating the application of a compressible member to the dash or instrument panel of an automobile;

Fig. 2 is a view in elevation illustrating the use of a compressible member extending throughout the length of the dash or instrument panel of an automobile;

Figs. 3 through 6 are views in section of detachable compressible members embodying the present invention, Fig. 3 being taken on the line 3—3 of Fig. 1;

Figs. 7 through 11 are views of permanently attached members embodying the present invention, Fig. 10 being taken on the line 10—10 of Fig. 11.

The advent of relatively high operating speeds of automobiles has created a need for improved safety devices to protect the occupants of automobiles in the event of abrupt stops. Examples of such improvements include the use of safety glass for the windshield and other windows of enclosed cars. Accident statistics, however, show that a substantial proportion of injuries resulting to automobile passengers involve crushing of the facial bones. Accidents of this character occur most frequently to occupants of the guest passenger seats and are occasioned by the sudden violent forward movement imparted to such passengers in the event of a collision. In accordance with current automobile body designs, the dash or instrument panels are positioned somewhat above the level of the seats, and it has been found that a majority of the above mentioned facial injuries are caused by striking these parts.

In accordance with the present invention, therefore, compressible or cushioning members are arranged to be secured to the instrument panel, either permanently, or detachably. Preferably, though not necessarily, the cushioning members are positioned at the upper or decorative part of the instrumental panel, thus leaving the lower parts available for the mounting of the usual instruments.

The cushioning members may be formed of various materials, but preferably are formed of a readily compressible member, such as sponge rubber, which is sufficiently flexible to lend itself to any desired curvature, and which may be conveniently attached. As described more in detail hereinafter, a cushioning member formed of sponge rubber may be permanently secured to a supporting panel either by vulcanizing, or by riveting at points along the surface. Where a riveted construction is employed, the cushioning member is preferably stretched somewhat in applying it, so that any tendency to looseness is avoided. In the detachable embodiments of the present invention, the cushioning member is preferably secured to one part of the instrument panel by a clip. The friction between the panel and the cushioning member may be relied upon to retain the remaining parts of the member in place. Alternatively, a flexible spring-like member may be imbedded in the member to positively bias the latter into engagement with the instrument panel. As an additional alternative, suction members may be incorporated into the cushioning member to bear against the instrument panel and secure the member in place on it.

As described in more detail hereinafter, in accordance with one embodiment of the present invention, the cushioning effect of the above described member may be supplemented by making one part of the instrument panel relatively movable with respect to the associated body portion. As illustrated, this is accomplished by pivotally connecting two sections of the instrument panel, and permitting limited movement of one part subject to the force of a retaining spring or springs. In accordance with this embodiment, the initial impact is absorbed by the rubber cushioning member and further forward movement of the passenger is absorbed by the supporting springs.

As will be apparent from a further reading of the specification, the cushioning member may extend either partially or entirely across the instrument panel. It has been found that the steering wheel acts as a protection to the driver of an automobile, so that the additional cushioning means of the present invention is particularly desirable in connection with the portions of the instrument panel not so protected. Accordingly, where the instrument panel permanently embodies a cushioning member, it is considered desirable that the cushioning surface be flush with the surface of the remaining portions of the dash, thus avoiding abrupt changes in contour.

Applicant's co-pending application, Serial No. 87,169, filed June 25, 1936 as a division hereof, includes claims to structures of the types discussed in the preceding two paragraphs.

Referring to Figs. 1 and 3, a compressible member 20, preferably composition or sponge rubber, is formed to substantially follow the configuration of the upper or decorative surface of a dash or instrument panel 21. Clips 22, preferably embedded in member 20 at intervals along the length thereof, extend from member 20, and may be secured between the sealing strip 25, associated with windshield 26, and cowl 27. The clips 22, which may be relatively rigid or quite flexible, may be provided with enlarged end portions 28 which abut against strip 25. Alternatively, as indicated in dotted lines, clips 22 may be provided with turned-in ends 23 which pass under and engage corresponding turned-in ends 24 of panel 21. This engagement compresses member 20 somewhat, and firmly secures it along the upper surface of panel 21.

The curvature of member 20 is normally such that a slight outward flexing thereof is required to cause it to surround the corresponding areas of panel 21. In accordance with this embodiment of the present invention, the friction between members 20 and 21 is relied upon to supplement the action of clips 22 and maintain member 20 in place with respect to panel 21.

As shown in Fig. 1, member 20 extends only partially across panel 21, since the automobile steering wheel ordinarily prevents the driver from being thrown against the panel. Alternatively, as shown in Fig. 2, the embodiment just described as well as the others illustrated, may extend entirely across panel 21.

In accordance with the modification illustrated in Fig. 4, the previously mentioned clips 22 are replaced by inserts 30, entirely embedded in, and extending substantially around member 20, which retain the latter frictionally and resiliently in engagement with panel 21. The turned-in end 31 of member 20 cooperates with lip 23 in the above described manner. In accordance with this modification, member 20 is applied by securing lip 31 under lip 23 and flexing member 20 sufficiently to pass over panel 21.

In the modification illustrated in Figs. 5 and 6, compressible members 20 are caused to adhere to panels 21 through the use of suction devices. In Fig. 5, suction devices 41 are embedded in member 20 and bear against panel 21, retaining member 20 in place in a familiar manner. In Fig. 6 the suction cups 42 are molded into member 20 and maintain it in place in a corresponding manner. With these modifications, also, it is preferable that a slight flexing of member 20 be required to enable it to pass over panel 21.

In the modifications illustrated in the remaining figures, Nos. 7 through 11, the compressible members 20 are permanently associated with the panels 21. In accordance with the present invention, this permanent association may be provided in a variety of ways. In Fig. 7, for example, member 20 may be permanently secured to panel 21 by any well known vulcanizing process. In Fig. 8, the member 20 is formed with an extended turned-in lip 51, which is stretched over a cooperating lip 52 formed at the upper end of panel 21. The other side of member 20 is permanently secured to panel 21 by one or more embedded rivets such as 53.

In the modification illustrated in Fig. 9, the cowl or instrument panel is divided into two sections 60 and 61. The upper section 61 is flexibly mounted for movement against the force of a spring 62, which is seated in recesses 63 and 64 formed in panel 65 and section 61 respectively. Sections 60 and 61 are hingedly connected together by a pin 67. In accordance with this modification, member 20 softens the initial impact of the passenger and further forward movement of the latter is absorbed by springs 62, a plurality of which may be spaced along the length of the cowl or instrument panel.

In accordance with the modification illustrated in Figs. 10 and 11, member 20 is formed as a cylindrical sector and is vulcanized to the vertical portion 71 of panel 21. If desired, member 20 may extend throughout only a portion of the length of panel 21, as shown in Fig. 11. The outer surface of the remaining portion of panel 21 may be formed to follow the configuration of the outer surface of member 20, thus avoiding an abrupt change in the contour of the panel.

From the foregoing, it will be seen that the present invention provides effective protection for the occupants of an automobile against injuries resulting from sudden forward movement. These protective devices may either be detachably associated with the automobile body or permanently associated therewith.

Although specific embodiments have been described, it is evident that various modifications may be made without departing from the spirit and scope of the present invention. The described embodiments, accordingly, are to be considered in an illustrative, and not in a limiting, sense.

What is claimed is:

1. A vehicle instrument panel crash pad adapted to protect an occupant from injurious impact against the instrument panel which comprises a cushioning member adapted to conform to the shape of a portion at least of the instrument panel and to engage the outer surface of said portion, and means cooperating between the cushioning member and the surface of the said instrument panel for securing the cushioning member to the instrument panel.

2. A vehicle instrument panel crash pad adapted to protect an occupant from injurious impact against the instrument panel which comprises a cushioning member adapted to conform to the shape of a portion at least of the instrument panel and to engage the outer surface of said portion, and means adapting said cushioning member to cooperate frictionally with the surface of said instrument panel to secure said cushioning member to the instrument panel.

3. A vehicle instrument panel crash pad adapted to protect an occupant from injurious impact against the instrument panel which comprises a cushioning member adapted to conform to the shape of a portion at least of the instrument panel and to engage the outer surface of said portion, and means including a lip formed on said cushioning member engageable with the surface of said instrument panel for securing the cushioning member to the instrument panel.

4. A vehicle instrument panel crash pad adapted to protect an occupant from injurious impact against the instrument panel which comprises a cushioning member adapted to conform to the shape of a portion at least of the instrument panel and to engage the outer surface of said portion, and means including an element embedded in said cushioning member for cooperating with the surface of said instrument panel for securing the cushioning member to the instrument panel.

5. A vehicle instrument panel crash pad adapted to protect an occupant from injurious impact against the instrument panel which comprises a cushioning member adapted to conform to the shape of a portion at least of the instrument panel and to engage the outer surface of said portion, and means including a suction cup for cooperating between said cushioning member and the surface of said instrument panel for securing the cushioning member to the instrument panel.

CLAIRE L. STRAITH.